United States Patent
Park

(10) Patent No.: US 12,095,829 B2
(45) Date of Patent: Sep. 17, 2024

(54) METHOD FOR MANAGING COMMUNICATION CHANNEL FOR EACH OF A PLURALITY OF PARTICIPANTS OF ONLINE MEETING ROOM AND SYSTEM USING THE SAME

(71) Applicant: Pagecall, Inc., Seoul (KR)

(72) Inventor: Ju Rung Park, Seoul (KR)

(73) Assignee: Pagecall, Inc., Seoul (KR)

( * ) Notice: Subject to any disclaimer, the term of this patent is extended or adjusted under 35 U.S.C. 154(b) by 0 days.

(21) Appl. No.: 18/377,347

(22) Filed: Oct. 6, 2023

(65) Prior Publication Data
US 2024/0121279 A1   Apr. 11, 2024

(30) Foreign Application Priority Data
Oct. 7, 2022   (KR) .................. 10-2022-0128229

(51) Int. Cl.
*H04M 3/00*   (2024.01)
*H04L 12/18*   (2006.01)
(Continued)

(52) U.S. Cl.
CPC ...... *H04L 65/1089* (2013.01); *H04L 12/1822* (2013.01); *H04L 51/046* (2013.01); *H04L 65/4038* (2013.01)

(58) Field of Classification Search
CPC ............. H04L 65/403; H04L 12/1822; H04L 63/08; H04L 65/1069; H04L 12/1827;
(Continued)

(56) References Cited

U.S. PATENT DOCUMENTS

| 6,519,335 B1 * | 2/2003 | Bushnell ............. H04M 3/436 379/373.02 |
| 10,775,990 B1 * | 9/2020 | Jamison ............. G06F 16/955 |

(Continued)

FOREIGN PATENT DOCUMENTS

| JP | H11234640 A | 8/1999 |
| KR | 1020140091141 A | 7/2014 |
| KR | 1020150117797 A | 10/2015 |
| KR | 1020220046773 A | 4/2022 |

OTHER PUBLICATIONS

Office Action issued of Korean Patent Application No. 10-2022-0128229 dated Jan. 6, 2023.

*Primary Examiner* — Kharye Pope
(74) *Attorney, Agent, or Firm* — Dinsmore & Shohl LLP; Yongsok Choi, Esq.

(57) ABSTRACT

Provided is a method of managing a communication channel for each of a plurality of participants in an online meeting room through a service server including displaying a host channel that only a host is able to enter, displaying a plurality of participant channels for communication with each of a plurality of participants, when a first participant channel for communication with a first participant is selected by the host, activating a first voice conversation between the host and the first participant through the first participant channel, when a second participant channel for communication with a second participant is selected by the host, deactivating the first voice conversation with the first participant, and activating a second voice conversation between the host and the second participant through the second participant channel.

9 Claims, 9 Drawing Sheets

(51) Int. Cl.
    *H04L 12/66*     (2006.01)
    *H04L 51/046*     (2022.01)
    *H04L 65/1089*     (2022.01)
    *H04L 65/4038*     (2022.01)
    *H04M 5/00*     (2006.01)

(58) Field of Classification Search
    CPC ............ H04L 12/1818; H04L 67/306; H04L 63/083; H04L 63/10; H04L 65/401; H04L 2209/463; H04L 67/104; H04L 12/18; H04L 67/54; H04N 7/15; H04N 7/157; H04N 21/4788; H04N 7/152; H04M 3/567; H04M 3/56; H04M 7/006; H04M 2201/42; H04M 2203/655; H04M 2201/38; H04M 2203/5054; H04M 3/562; H04M 3/382; H04M 2203/652; H04M 3/42365; H04M 2203/5009; H04M 2203/5027; H04W 4/90; H04W 76/50; H04W 88/02; H04W 4/029; H04W 4/02; H04W 4/16; H04W 60/04; H04W 12/72; H04Q 2213/13091
    USPC ........ 709/204, 227, 203; 370/260, 261, 352, 370/262; 379/202.01, 205.01, 93.21, 379/265.09
See application file for complete search history.

(56) References Cited

U.S. PATENT DOCUMENTS

| | | | |
|---|---|---|---|
| 10,951,564 B1* | 3/2021 | Delp | H04L 51/212 |
| 2007/0022201 A1* | 1/2007 | Aaby | H04L 12/1818 |
| | | | 709/227 |
| 2007/0072593 A1* | 3/2007 | Huliyapur Math | H04M 1/663 |
| | | | 455/415 |
| 2010/0222028 A1* | 9/2010 | Gisby | H04M 1/724 |
| | | | 455/412.2 |
| 2012/0287827 A1* | 11/2012 | Denne | H04L 12/1818 |
| | | | 370/261 |
| 2014/0362165 A1* | 12/2014 | Ackerman | H04N 7/152 |
| | | | 348/14.07 |
| 2018/0012191 A1* | 1/2018 | Rosenberg | H04L 67/01 |
| 2019/0014062 A1* | 1/2019 | Hodge | H04L 67/306 |
| 2019/0026298 A1* | 1/2019 | Jin | H04L 12/1822 |
| 2020/0169559 A1* | 5/2020 | Jones | H04L 63/102 |
| 2020/0311138 A1* | 10/2020 | Wahl | H04L 51/046 |
| 2020/0380468 A1* | 12/2020 | Crawford | H04L 67/55 |
| 2021/0034653 A1* | 2/2021 | Wilczynski | G01S 5/02522 |
| 2021/0243570 A1* | 8/2021 | Klym | H04L 67/75 |
| 2023/0121137 A1* | 4/2023 | Munoz | H04L 65/1046 |
| | | | 709/224 |
| 2023/0246862 A1* | 8/2023 | Boucheron | G06Q 10/06311 |
| | | | 709/204 |

* cited by examiner

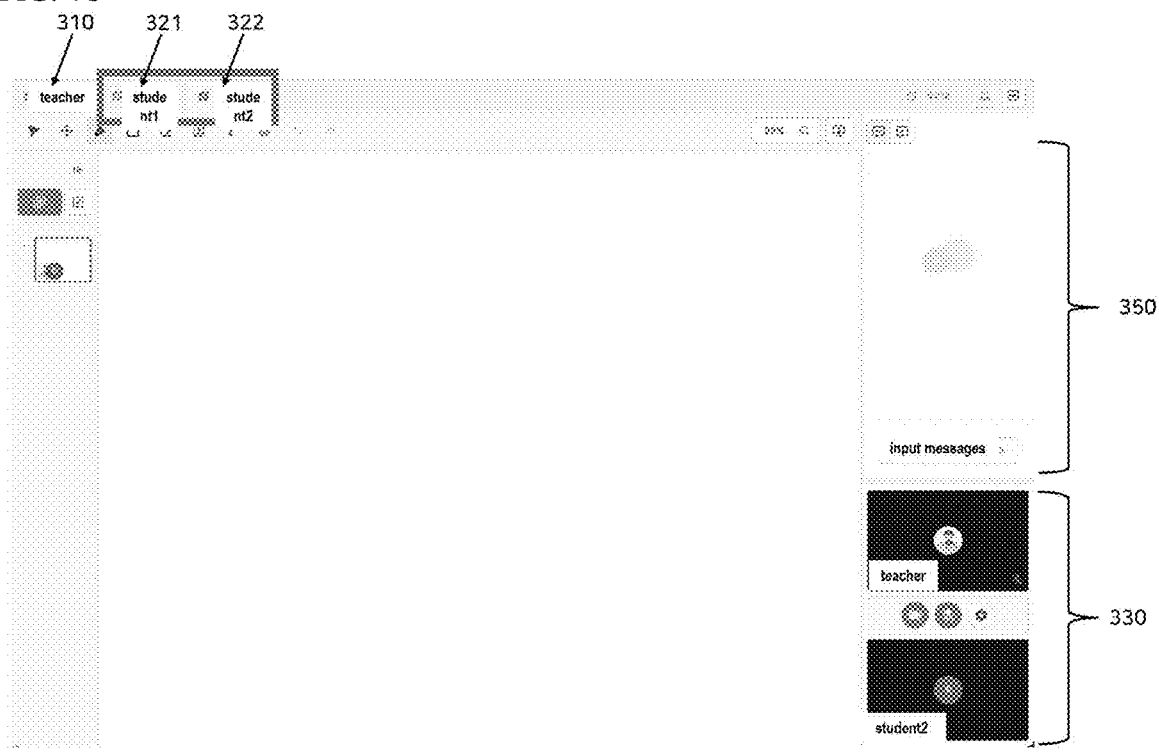

METHOD FOR MANAGING COMMUNICATION CHANNEL FOR EACH OF A PLURALITY OF PARTICIPANTS OF ONLINE MEETING ROOM AND SYSTEM USING THE SAME

CROSS-REFERENCE TO RELATED APPLICATION

This application claims priority to Korean Patent Application No. 10-2022-0128229 filed on Oct. 7, 2022, the entire contents of which are herein incorporated by reference.

TECHNICAL FIELD

The present disclosure relates to a method of managing a communication channel for each of a plurality of participants of an online meeting room and a system using the same. More particularly, the present disclosure relates to a method and system for opening and managing a communication channel for each of a plurality of participants that allows individual communication between a host and the plurality of participants inside an online meeting room.

BACKGROUND ART

With the development of Internet and communication technology and the spread of non-face-to-face culture, applications related to remote communication such as image calls, video conferences, online meetings, electronic meetings, collaboration systems, etc. involving multiple user terminals are increasingly being used in various ways.

General online video communication systems assume that participants connected to the same meeting room share the same image and voice channel. In other words, when a speaker in a meeting room transmits image and voice, all participants inside the meeting room generally receive the same image and voice data. However, this form of communication is insufficient to closely transform the form of centralized communication that takes place in everyday offices, schools, etc. to an online form.

Centralized communication, for example, is communication between a host, who is a team leader, and participants, who are multiple team members, and has a multiplexed form of 1:1 communication between the team leader and team members. In other words, the team leader who acts as the host communicates 1:1 with all team members, but team members do not communicate with each other. In a similar way, an instructor who acts as a host of a local study room communicates 1:1 with all students, but because students are all in different academic years and progress, there are cases where students do not communicate with each other.

In this case, the fact that communication between the team leader and a team member other than a person is open to everyone may be considered noise, and on the other hand, the person may also feel burdened by the fact that communication with the team leader is open to all other team members. The problem may be solved by the team leader having an individual office space in an office which is a real physical space and team members coming and going to the team leader's office space. However, when this form of communication is now moved to an online video communication system, various inconvenient problems will arise.

To solve these problems, there is a method in which a team leader or instructor opens several 1:1 meeting rooms with participants and communicates with participants by moving between program windows. However, in this case, when microphone and speaker permissions are not properly adjusted, there is always a chance that communication overlaps or generates noise.

Therefore, a new method of opening and managing a communication channel that allows 1:1 individual communication between a host and each of a plurality of participants of an online meeting room, and a method and system for providing a customized user experience (UX)/user interface (UI) for the new method, are required.

DISCLOSURE

Technical Problem

The present disclosure is directed to providing a method and system for opening and managing a communication channel for each of a plurality of participants that allows 1:1 individual communication between a host and the plurality of participants inside an online meeting room.

The present disclosure is also directed to providing a user experience (UX)/user interface (UI) capable of providing a communication channel for a host and each of a plurality of participants in an online meeting room in the form of a plurality of tab browsers.

The present disclosure is also directed to providing a multiplexed form of 1:1 communication for centralized communication between one host and a plurality of participants, so that the host efficiently communicates with all the participants while maintaining independent and private communication between the participants.

The present disclosure is also directed to providing a method and system for efficiently managing a plurality of participants by managing communication calls of the plurality of participants with a host, and allowing the host to check images, whiteboards, messages, etc. of all the participants in a host channel which is a host space.

The problems of the present disclosure are not limited to those mentioned above, and other technical problems not mentioned will be clearly understood by those skilled in the art from the following description.

Technical Solution

In an embodiment of the present disclosure, there is provided a method of managing a communication channel for each of a plurality of participants in an online meeting room through a service server including displaying a host channel that only a host is able to enter, displaying a plurality of participant channels for communication with each of a plurality of participants, when a first participant channel for communication with a first participant is selected by the host, activating a first voice conversation between the host and the first participant through the first participant channel, when a second participant channel for communication with a second participant is selected by the host, deactivating the first voice conversation with the first participant, and activating a second voice conversation between the host and the second participant through the second participant channel.

The host channel and the plurality of participant channels may be displayed in a selectable tab form on a web browser.

When the host channel is selected by the host, the host may be configured to select each of the plurality of participants and send and receive a message to and from each participant.

The method may further include, when the host is called by the first participant, activating and displaying the call status of the first participant channel; and when the first participant channel is selected by the host device after a call of the first participant, deactivating the call status of the first participant channel on the screen of the host device and removing the displaying of the call status.

The method may further include, when the host is called by the first participant and the second participant, displaying a call status of the first participant channel and a call status of the second participant channel together with a call priority; and when the first participant channel is selected by the host device, deactivating the call status of the first participant channel and removing the displaying of the call status, and changing and displaying the call priority of the second participant channel.

The method may further include, when the first voice conversation between the host and the first participant is activated through the first participant channel, deactivating voice conversations with participants other than the first participant; and displaying an image screen of each of the other participants for monitoring the other participants.

The method may further include, when the host channel is selected by the host, displaying all whiteboard screens of current statuses of the plurality of participants.

In another embodiment of the present disclosure, there is provided a system for managing a communication channel for each of a plurality of participants in an online meeting room including a host device configured to transmit a request for generating a meeting room to a service server; a plurality of participant devices configured to transmit a connection request related to entrance to the meeting room to the service server; and the service server configured to display a host channel that only a host is able to enter, display a plurality of participant channels for communication with each of a plurality of participants, when a first participant channel for communication with a first participant is selected by the host, activate a first voice conversation between the host and the first participant through the first participant channel, and when a second participant channel for communication with a second participant is selected by the host, deactivate the first voice conversation with the first participant, and activate a second voice conversation between the host and the second participant through the second participant channel.

Advantageous Effects

The present disclosure may provide a method and system for opening and managing a communication channel for each of a plurality of participants that allows 1:1 individual communication between a host and the plurality of participants inside an online meeting room.

The present disclosure may also provide a UX/UI capable of providing a communication channel for a host and each of a plurality of participants in an online meeting room in the form of a plurality of tab browsers.

The present disclosure may also provide a multiplexed form of 1:1 communication for centralized communication between one host and a plurality of participants, so that the host efficiently communicates with all the participants while maintaining independent and private communication between the participants.

The present disclosure may also provide a method and system for efficiently managing a plurality of participants by managing communication calls of the plurality of participants with a host, and allowing the host to check images, whiteboards, messages, etc. of all the participants in a host channel which is a host space.

The effects of the present disclosure are not limited to those mentioned above, and other effects not mentioned will be clearly understood by those skilled in the art from the following description.

DESCRIPTION OF DRAWINGS

FIGS. 4A to 4C are diagrams illustrating a screen of a host device managing a call status based on a call priority of each participant channel according to an embodiment of the present disclosure.

MODE FOR INVENTION

Hereinafter, with reference to the accompanying drawings, the present disclosure will be described in detail so that those skilled in the art may easily implement the present disclosure. However, the present disclosure may be embodied in many different forms and is not limited to the embodiments described herein.

The terms used herein are for the purpose of describing embodiments and are not intended to limit the present disclosure. As used herein, the singular forms also are intended to include the plural forms as well, unless the context clearly indicates otherwise.

It will be further understood that the terms "comprises" and/or "comprising," when used in this specification, specify the presence of stated elements, steps, operations, and/or components, but do not preclude the presence or addition of one or more other elements, steps, operations, and/or components.

In addition, the terms including ordinals such as "first", "second", etc. may be used to describe various components, but the components are not limited to these terms. The terms are used only for the purpose of distinguishing one component from another. In addition, in describing the present disclosure, when it is determined that a detailed description of a related known technology may obscure the spirit of the present disclosure, a detailed description thereof will be omitted.

In addition, configuration units shown in the embodiments of the present disclosure are independently illustrated to represent different characteristic functions, and does not mean that each configuration unit includes separate hardware or a single software configuration unit. That is, each configuration unit is listed and described as a respective configuration unit for convenience of description, and at least two configuration units of each configuration unit are combined to form a single configuration unit, or one configuration unit may be divided into a plurality of configuration units to perform a function. Integrated embodiments and separate embodiments of each of the configuration units are also included in the scope of the present disclosure unless departing from the spirit of the present disclosure.

Hereinafter, embodiments of the present disclosure will be described in detail with reference to the accompanying drawings. The configuration of the present disclosure and its effect will be clearly understood through the detailed description below.

Figure 1:
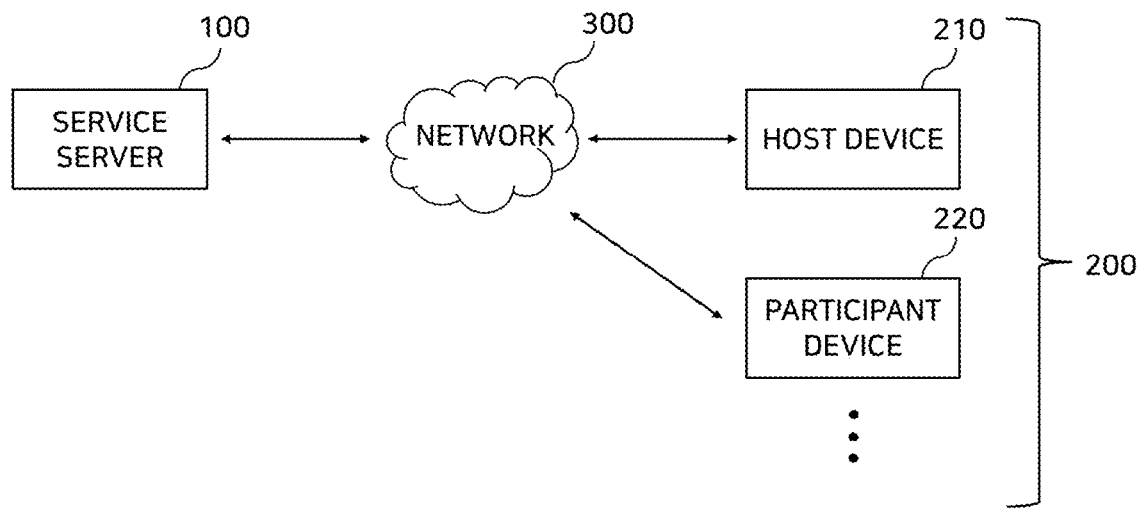
FIG. 1 is a diagram for explaining a system managing a communication channel for each of a plurality of participants of an online meeting room according to an embodiment of the present disclosure.

FIG. 1 is a diagram for explaining a system managing a communication channel for each of a plurality of participants of an online meeting room according to an embodiment of the present disclosure.

A service server 100 may serve to provide a communication service for remote online meeting, such as a video education solution and a video conference solution, to users (a host and participants) in the form of web or application (app), and may be configured as various types of terminal devices or a computer program or a combination thereof. Users including a host to whom all communications are centralized and capable of managing a plurality of communication channels and a plurality of participants assigned to the respective communication channels may access a communication service by installing an application or connecting to the web through user devices 200. Here, among the user devices 200, a host device 210 is a device used by the host to whom a centralized communication is centralized and serves as a manager, for example, a teacher, a team leader, or a room manager, there is only one host that is a user of the host device 210 in one online meeting room, and participant devices 220 are devices used by a plurality of participants to serve as, for example, students, team members, and room members and communicate with the host and may be present as a plurality of devices used by the plurality of participants.

The service server 100 may be configured to be communicable with the plurality of user devices 200 including the host device 210 and the participant device 220 over a network 300, and the network 300 is a component for performing wired and wireless communication for data transmission and reception between the user device 200 and the plurality of user devices 200, and may include cellular communication or near field communication when the network 300 is a wireless communication network. For example, cellular communications may include at least one of Long-Term Evolution (LTE), LTE Advanced (LTE-A), 5th Generation (5G), Code Division Multiple Access (CDMA), Wideband CDMA (WCDMA), Universal Mobile Telecommunications System (UMTS), Wireless Broadband (WiBro), or Global System for Mobile Communications (GSM). In addition, near field communication may include at least one of Wireless Fidelity (Wi-Fi), Bluetooth, Zigbee, Near Field Communication (NFC), or Radio Frequency Identification (RFID). However, a communication method is not limited to the above and will also include wireless communication technology developed in the future.

The plurality of user devices 200 including the host device 210 and the plurality of participant devices 220 are devices configured to be used by a user who is a host or participant to be connectable to the service server 100, and, specifically, may be any one of smartphones, tablet computers, desktop computers, laptop computers, notebooks, workstations, personal digital assistants (PDA), portable computers, wireless phones, mobile phones, e-books, portable multimedia players (PMP), portable game consoles, digital cameras, televisions, wearable devices, or artificial intelligence (AI) speakers, but are not limited to these. In addition, the user device 200 may include a display unit providing a screen, a user input unit receiving a user input, and a voice output unit such as a speaker.

The service server 100 may be configured to display a host channel that only the host is able to enter, display a plurality of participant channels for communication with each of the plurality of participants, when a first participant channel for communication with a first participant is selected by the host, activate a first voice conversation between the host and the first participant through the first participant channel, when a second participant channel for communication with a second participant is selected by the host, deactivate the first voice conversation with the first participant, and activate a second voice conversation between the host and the second participant through the second participant channel. More specific configuration and function of the service server 100 will be described with reference to FIG. 2.

Figure 2:
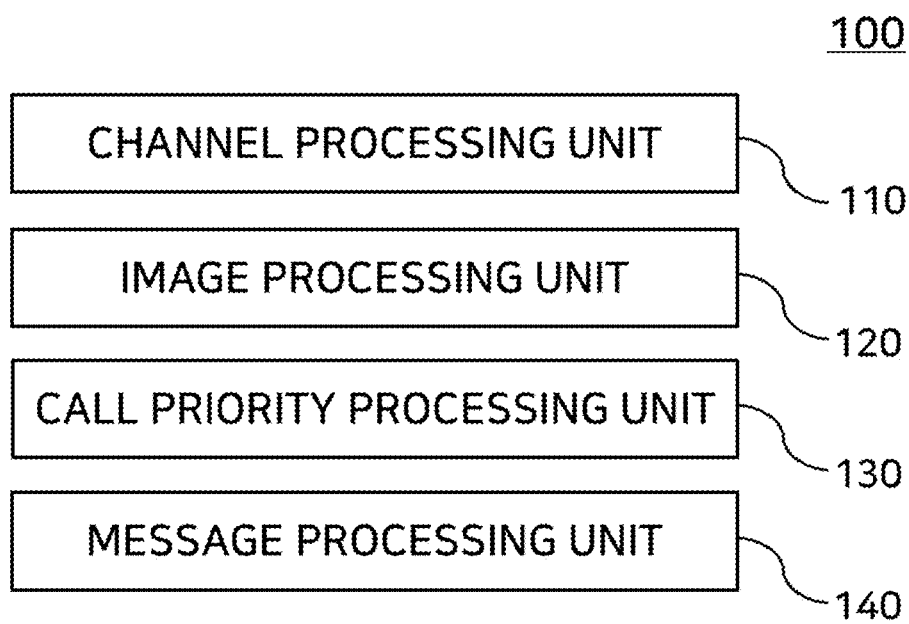
FIG. 2 is a block diagram for explaining a configuration of a service server according to an embodiment of the present disclosure.

FIG. 2 is a block diagram for explaining a configuration of the service server 100 according to an embodiment of the present disclosure.

The service server 100 may include components such as a channel processing unit 110, an image processing unit 120, a call priority processing unit 130, and a message processing unit 140, but is not limited to these components.

The channel processing unit 110, the image processing unit 120, the call priority processing unit 130, and the message processing unit 140 may each include a program or program module that may be executed by one or more processors, where the program or program module may be configured in the form of an operating system, application program, or program, and may be physically stored on various types of widely used storage devices. Such a program or program module may include various forms for performing one or more routines, subroutines, programs, objects, components, instructions, data structures, and specific tasks or executing a specific data type, and is not limited to these forms.

First, the channel processing unit 110 may be configured to generate a host channel that only a host is able to enter and a plurality of participant channels for communication between the host and the respective participants through the host device 210 and display the host channel and the plurality of participant channels on a screen of a user device. For example, when one host and ten participants are in an online meeting room, a total of eleven channels including one host channel and ten participant channels for the respective participants may be generated and separately displayed. The channel processing unit 110 may display the host channel and the plurality of participant channels in the form of selectable tabs on a web browser.

In addition, the channel processing unit 110 may be configured to display all the host channel and the plurality of participant channels on the host device 210 and select any one of the host channel and the plurality of participant channels to enable connection to the selected channel, and display only a participant channel assigned to a participant on each participant channel. As such, the host channel is a channel that only the host is able to connect and may be configured as a central management space capable of checking statuses of a plurality of participants and communicating with the plurality of participants.

The image processing unit 120 is configured to share only video and voice information between a person and the host on a channel assigned to participants simultaneously with connection of the participants, and accordingly, because video and voice information of other participant channels are not shared with the participants, the participants may not be able to know the existence of other participants. The image processing unit 120 may be configured to share video and voice with a specific participant from the moment the host connects to a channel of the participant, and to disconnect the video and voice from the host at the moment the host leaves the channel. Accordingly, the image processing unit 120 may be configured to activate a first voice conversation or a first image conversation between the host and a first participant through a first participant channel when a first participant channel for communication with the first participant is selected by the host, deactivate the first voice conversation or the first image conversation with the first participant when a second participant channel for communication with a second participant is selected by the host and the host moves to the second channel, and activate a second voice conversation or a second image conversation between the host and the second participant through the second participant channel.

In addition, the image processing unit 120 may be configured to display, on the screen of the host device 210, an image screen of each of the other participants in order to monitor the other participants in addition to the participant, even when connecting to a specific participant channel. At this time, the image processing unit 120 may be configured to deactivate voice conversations with the other participants except for the first participant and display only the image screen of each of the other participants on the screen of the host device 210 when the first voice conversation between the host and the first participant is activated through the first participant channel so as to visually monitor statuses of the other participants.

The call priority processing unit 130 may be configured to activate and display a call status of the first participant channel on the screen of the host device 210 when the host is called by the first participant, and, for example, may display whether the first participant channel is called and a call priority of the first participant channel on a first participant channel tab displayed on the screen. At this time, when the first participant channel is selected by the host after call of the first participant and the host connects to the first participant channel, the call priority processing unit 130 may be configured to deactivate the call status of the first participant channel on the screen of the host device 210 and remove the display of the call status.

For example, when the host is called by the plurality of participants, the first participant and the second participant, the call priority processing unit 130 may be configured to display the call status of the first participant channel and the call status of the second participant channel together with the call priority on the screen of the host device 210, and, when the first participant channel is selected by the host, configured to deactivate the call status of the first participant channel and remove the display of the call status, and change and display the call status of the second participant channel. For example, on a channel status display of two participants, the call priority may be displayed in the order in which the host is first called, with numbers such as 1 and 2 together with the call status display, and when the host connects to the first participant channel of the first priority, the call status and call priority display corresponding to the first participant channel may be deactivated and not displayed, and the call priority corresponding to the second participant channel of the second priority may be changed from 2 to 1 and displayed. According to the display and update of the call status and call priority, the host may easily check participant channels to connect on the screen of the host device 210.

When the host channel is selected by the host, the message processing unit 140 may be configured to enable the host device 210 to select each of the plurality of participants and send and receive a message to and from each of the participant devices 220. In addition, the message processing unit 140 may be configured to send the message to the host through a message input window that appears on a screen of the participant device 220.

As configured above, the host device 210 may connect to the host channel and be configured to monitor all video data of the plurality of participants, check the contents of individual whiteboards of the participants, and send and receive group or individual chat messages to and from the participants.

In addition, the host device 210 may be configured to be capable of navigating the plurality of participant channels, checking names and numbers of participants currently connecting, and checking whether the host is called and a priority number of the call for each participant channel, automatically send a message to a corresponding participant indicating that the host has checked the call by checking a call message, and start communication with the corresponding participant by clicking the name of the participant channel.

In addition, the host device 210 may be configured to be capable of receiving and monitoring video data of all participants other than participants belong to a current channel even after an individual participant enters the participant channel, and enable transmission and reception of chat messages with the participants belonging to the channel, writing of notes shared with the participants belonging to the channel, transmission and reception of video and voice data with the participants belonging to the channel, and manipulation of a whiteboard shared with the participants belonging to the channel.

Meanwhile, each of the participant devices 220 may be capable of sending and receiving chat messages with the host device 210, manipulating a whiteboard shared with the host, sending notifications to the host on another channel through a call button, and checking current connection information of the host device 210. For example, the screen of each participant device 220 may display the host status as 'waiting' when the host is on the host channel, as 'participating in another channel' when the host is on another participant channel, and as 'offline' when the host is not connected so that the participants may check the current connection information of the host.

Figure 3:
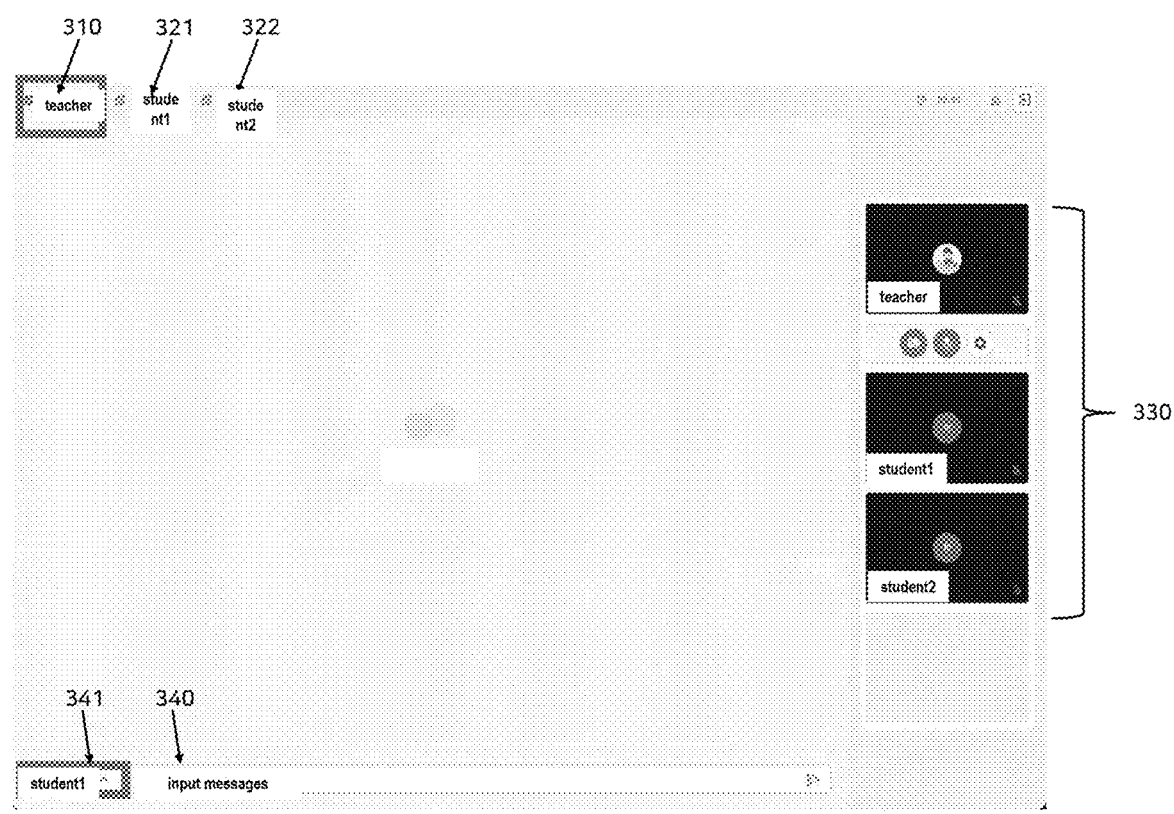
FIG. 3 is a diagram illustrating a screen of a host device providing a communication channel for each of a plurality of participants according to an embodiment of the present disclosure.

FIG. 3 is a diagram illustrating a screen of the host device 210 providing a communication channel for each of a plurality of participants according to an embodiment of the present disclosure.

FIG. 3 illustrates an example in which a host is a teacher and the plurality of participants are student 1 and student 2, and the host device 210 may display a host channel 310 and a first participant channel 321 or a second participant channel 322 as a plurality of participant channels in the form of a browser tab selectable by the host. The host channel 310 that only the host is able to enter may be displayed on only the host device 210, and an image display unit 330 displaying an image of the host and images of the plurality of participants may be disposed on the right side of the host device 210.

In addition, a participant selection unit 341 capable of selecting a desired participant from among current participants in order to select a target to send a message, and a message input unit 340 which is a window for inputting a message may be displayed on the bottom of the screen of the host device 210. Accordingly, the host is configured to enter the host channel 310 and send and receive group or individual chat messages to and from the participants.

Figure 4A:
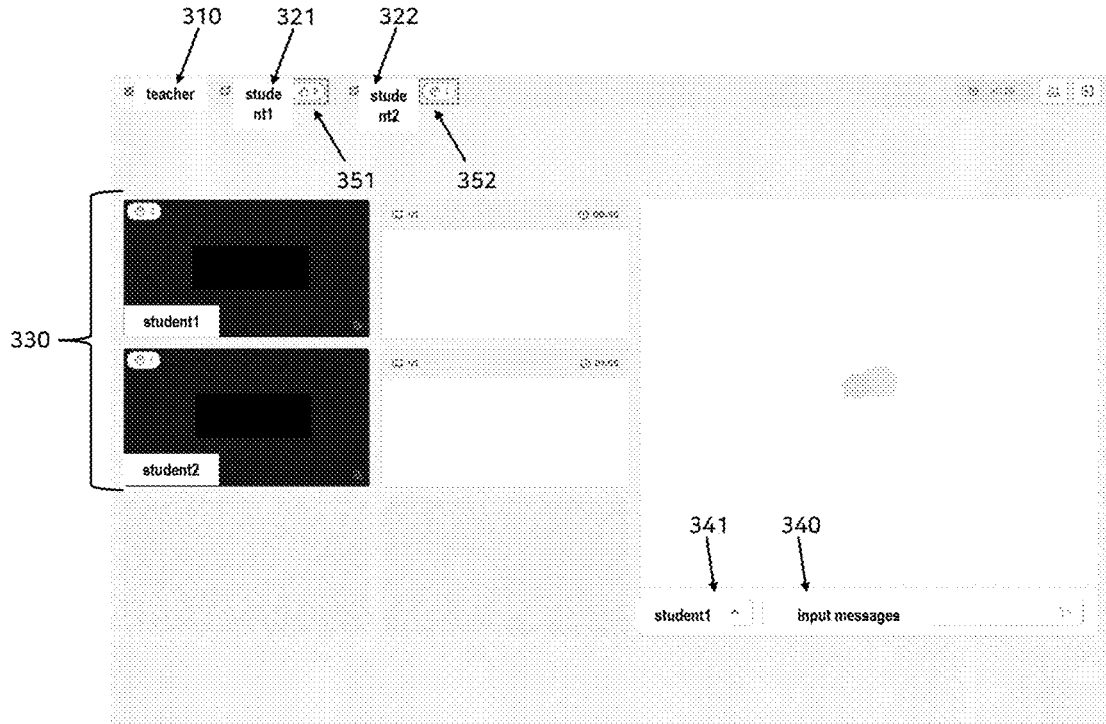
Figure 4B:
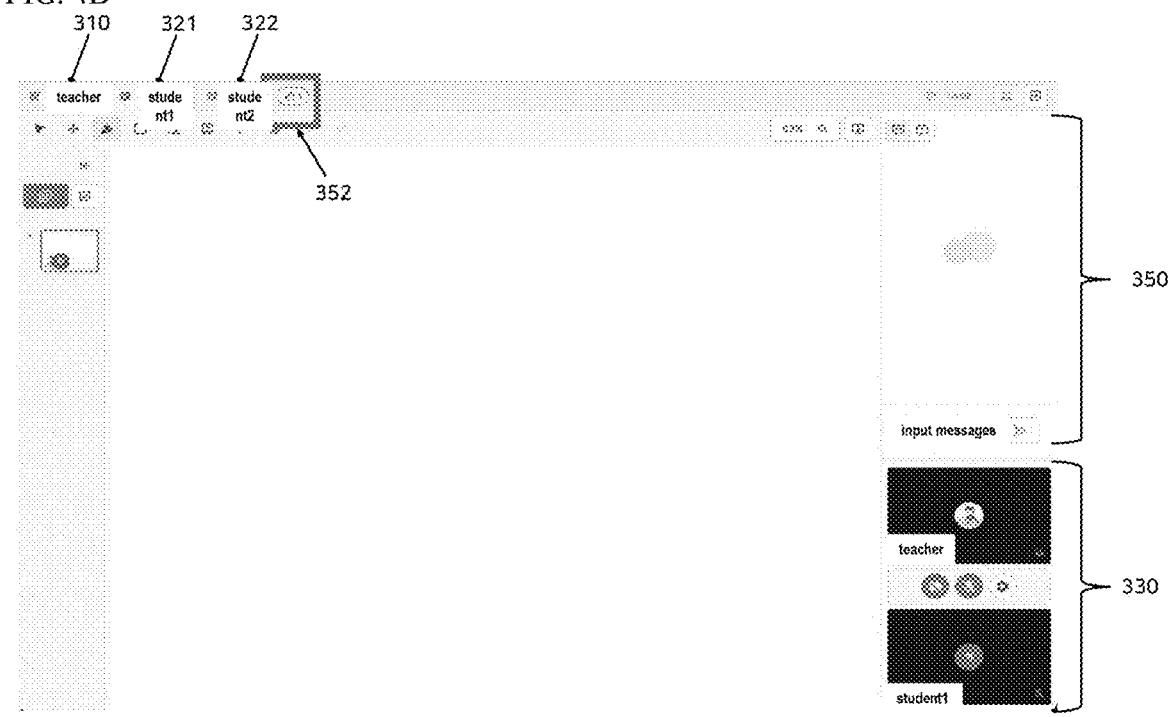

FIGS. 4A to 4C are diagrams illustrating a screen of the host device 210 managing a call status based on a call priority of each participant channel according to an embodiment of the present disclosure.

Referring to FIG. 4A, the screen of the host device 210 on which a host (teacher) is connected to the host channel 310 may display, for example, the palm display as whether a call is performed on a first participant channel 321 or a second participant channel 322 and the display of number 1 or 2 in the call order as the call priority on call priority display units 351 and 352 together by performing host calls of student 1 and student 2. Accordingly, the host is able to check whether the host is called and a priority number of the call for each participant channel in the host channel 310, and may select a desired participant channel and connect to the corresponding participant channel. In addition, the screen of the host device 210 displays the call priority on an image of each participant in the image display unit 330 displaying images of the plurality of participants so that it is possible to check whether the call is performed and the priority even in the participant (student) image.

Referring to FIG. 4B, when the host connects to the first participant channel 321, the display of both whether the call is performed and the call priority of the first participant channel 321 is removed and deactivated, and the call priority of the second participant channel 322 may be subtracted by 1 and changed and displayed. In addition, in the first participant channel 321, only images screens of the host and participant 1 may be displayed on the image display unit 330, and only messages between the host and participant 1 may be displayed on a message display unit 350. As described above, after the host connects to a specific participant channel, the display of whether the call is performed and the call priority of each participant channel is updated so that the host may check in real time update information of a participant channel requiring connection.

Referring to FIG. 4C, when the host leaves the first participant channel 321 and connects to the second participant channel 322, the display of both whether the call is performed and the call priority of the second participant channel 322 is removed and deactivated so that it may be checked that there is no additional participant being currently called. In addition, in the second participant channel 322, only images screens of the host and participant 2 may be displayed on the image display unit 330, and only messages between the host and participant 2 may be displayed on the message display unit 350.

Figure 5A:
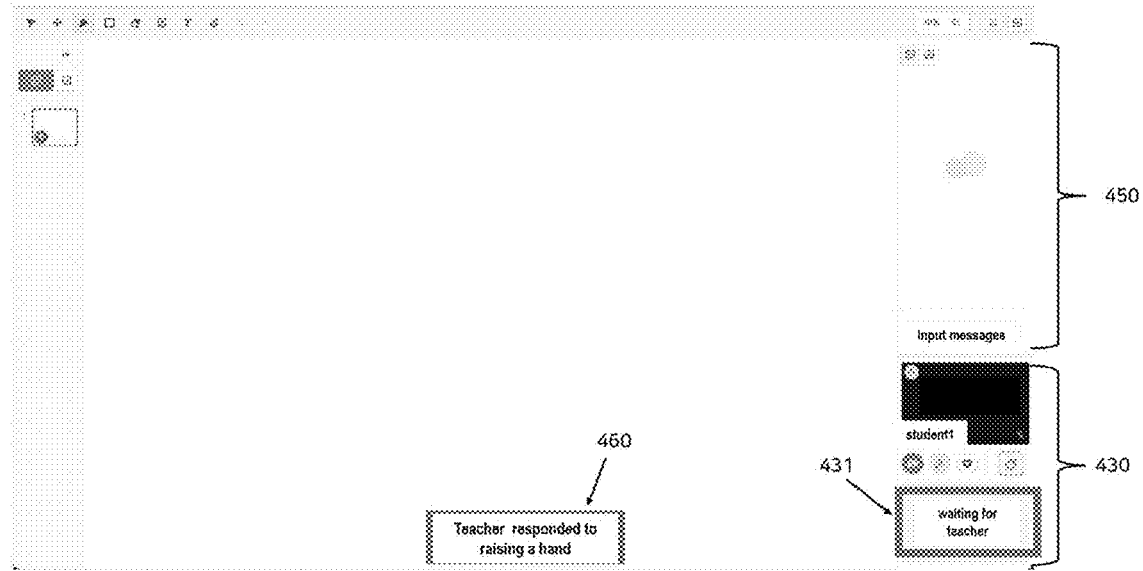
FIGS. 5A and 5B are diagrams illustrating a screen of a participant device where a teacher enters by a call of a participant according to an embodiment of the present disclosure.
Figure 5B:
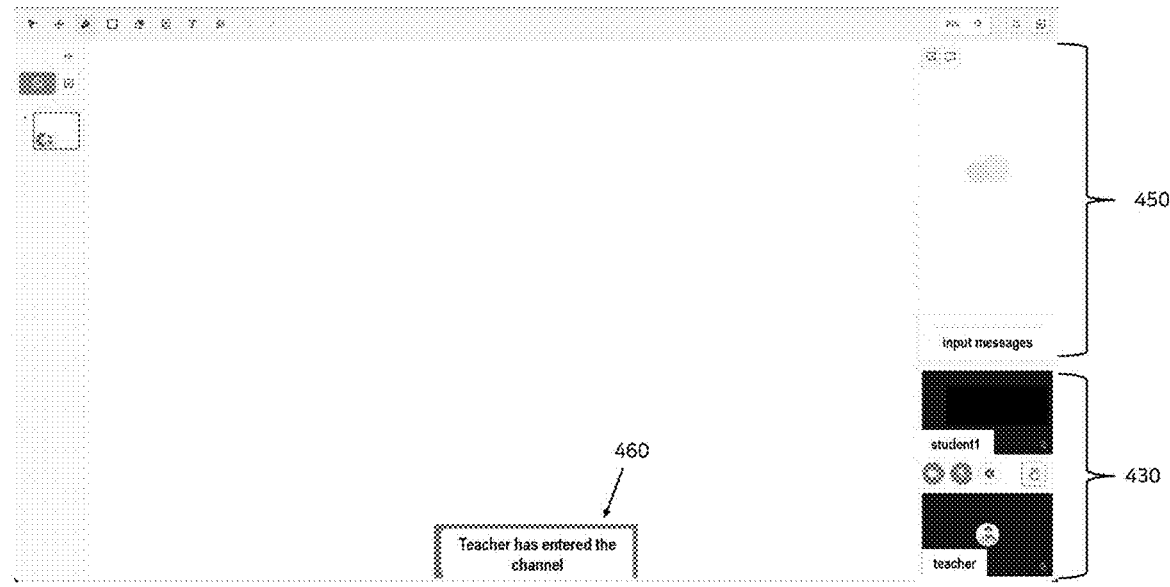

FIGS. 5A and 5B are diagrams illustrating a screen of the participant device 220 where a teacher enters by a call of a participant according to an embodiment of the present disclosure.

FIG. 5A illustrates the screen of the participant device 220 when the participant calls and a host is waiting on a host channel. After the call of the participant, a host status display unit 431 may display a host status as 'waiting' before the host connects to a corresponding participant channel, as 'participating in another channel' when the host is on another participant channel, and as 'offline' when the host is not connected.

In addition, when the host checks or responds to a corresponding message with respect to the call of the participant, the participant device 220 may display a participant notification message 460 indicating whether the host has checked the call, for example, a message such as "The teacher responded to raising a hand."

In addition, referring to FIG. 5B, when the host connects to and enters the corresponding participant channel, the participant notification message 460 may display a message such as "The teacher has entered the channel" and generate a notification sound In addition, image screens of the participant and the host may be displayed on the image display unit 430 of the participant device 220.

FIGS. 6A to 6D are diagrams illustrating screens of the participant device 220 and the host device 210 displaying a message according to an embodiment of the present disclosure.

Figure 6A:
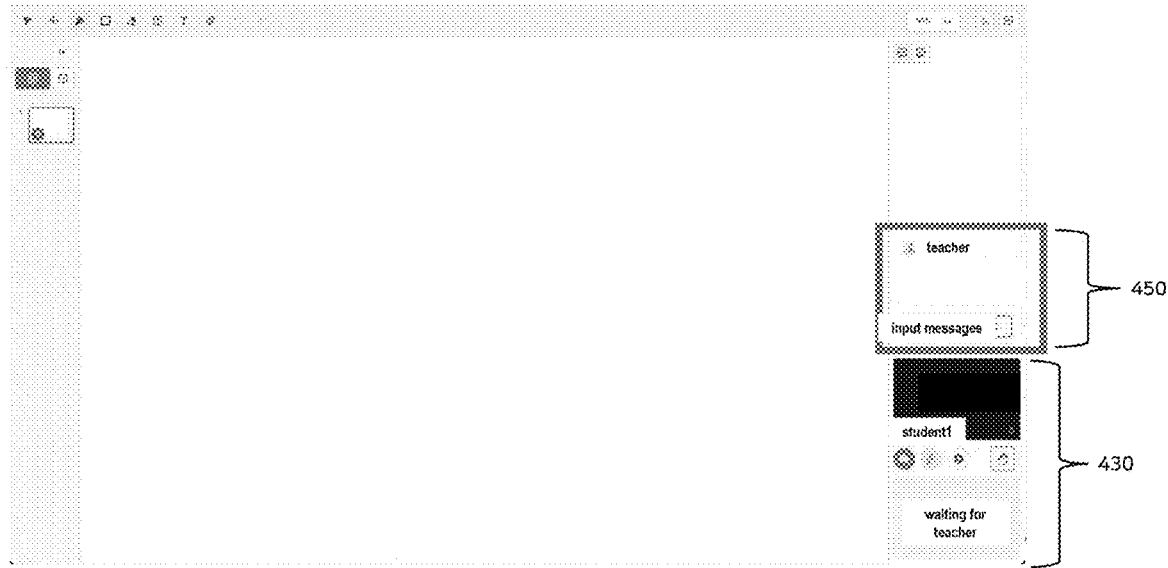
FIGS. 6A to 6D are diagrams illustrating screens of a participant device and a host device displaying a message according to an embodiment of the present disclosure.

Referring to FIG. 6A, a participant may chat with a host through the message display unit 450 on a participant channel screen assigned to the participant through the participant device 220, and is able to send and receive messages even if the host has not entered a corresponding participant channel.

Figure 6B:
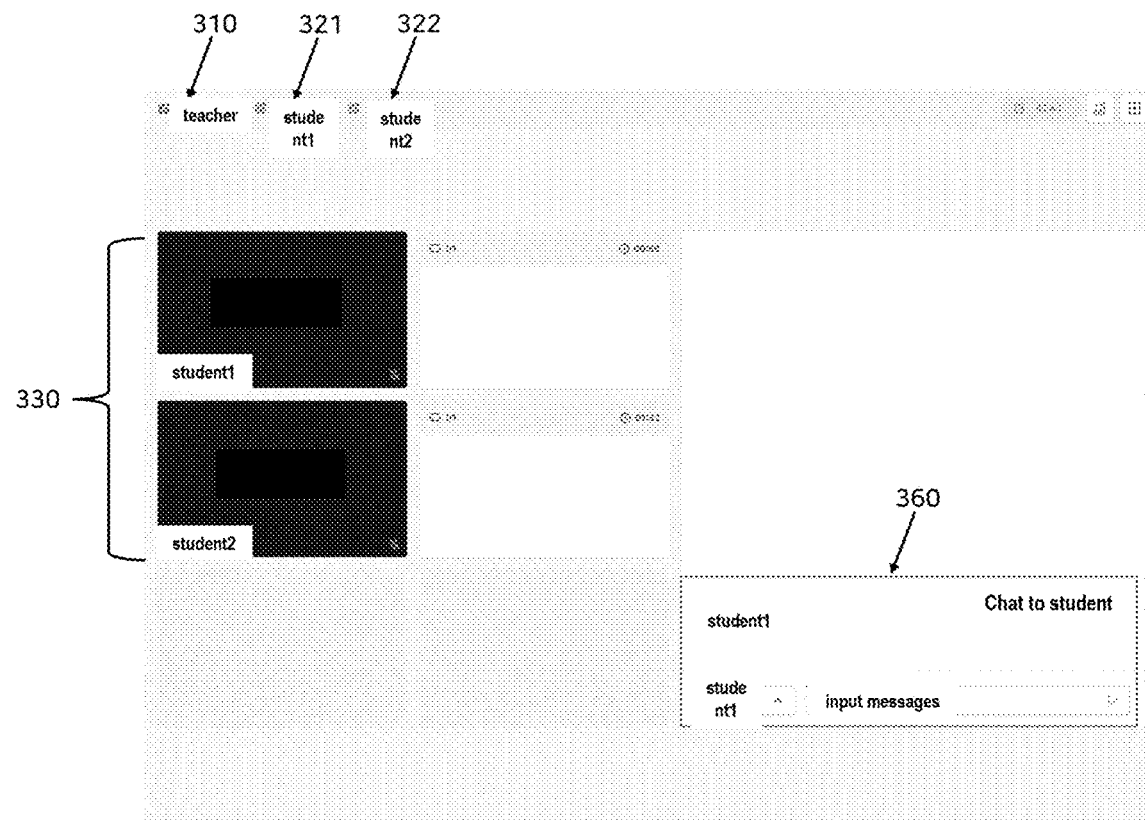

Referring to FIG. 6B, when the host connects to the host channel 310 through the host device 210, the host may send and receive messages with each participant, and display messages with all participants through a host channel message display unit 360. In addition, current images of all participants may be displayed through the image display unit 330.

Figure 6C:
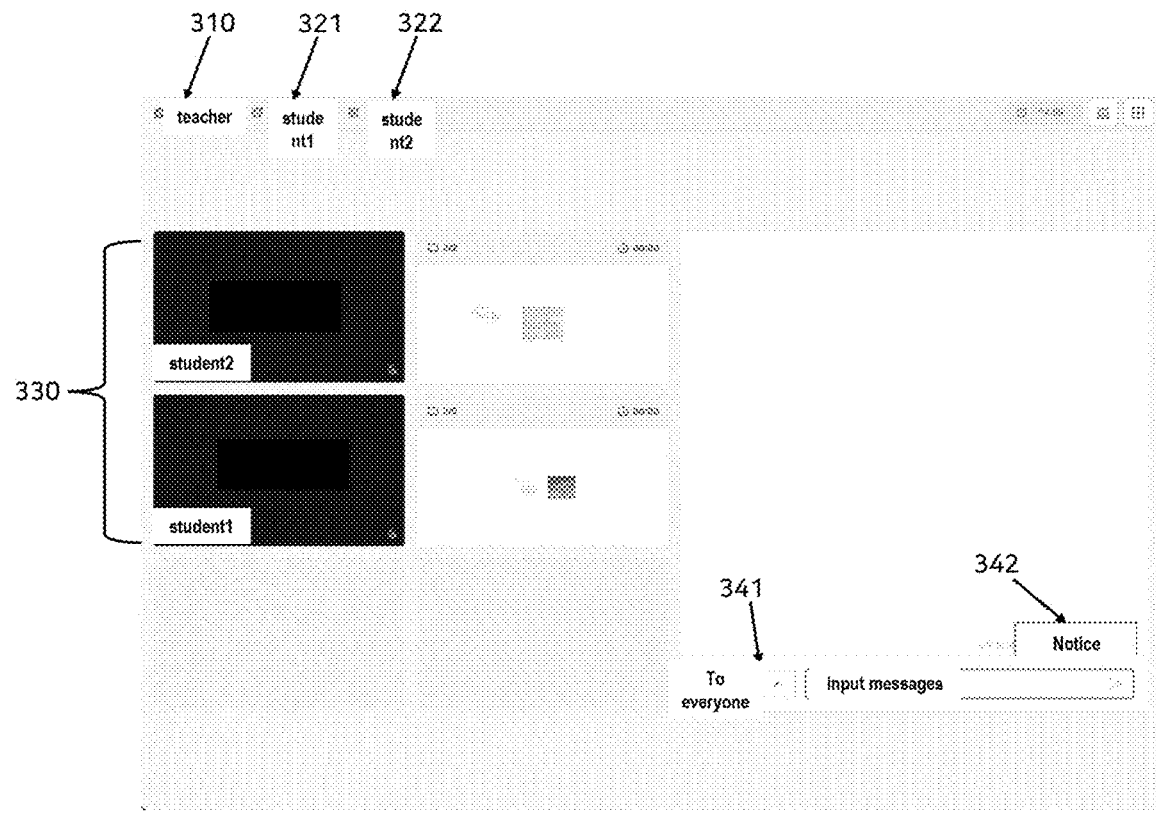

Referring to FIG. 6C, when the host connects to the host channel 310 through the host device 210, the host may send a notice message to all participants, for example, select the recipient as 'all' in a participant selection unit 341 to send a notice message 342 to all the participants, and at this time, all the participants may receive the notice message 342.

Figure 6D:
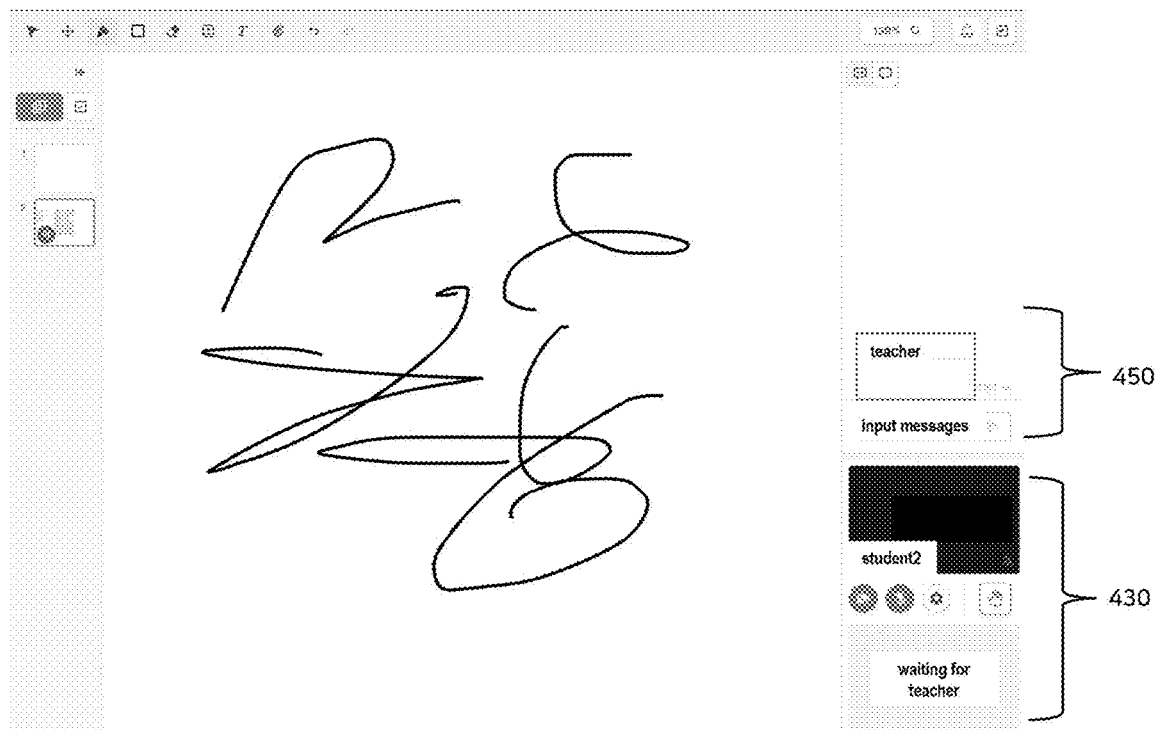

Referring to FIG. 6D, in response to the sending of the notice message 342 of the host, the notice message 342 sent by the host to all the participants may be displayed on a screen of each participant device 220.

Figure 7:
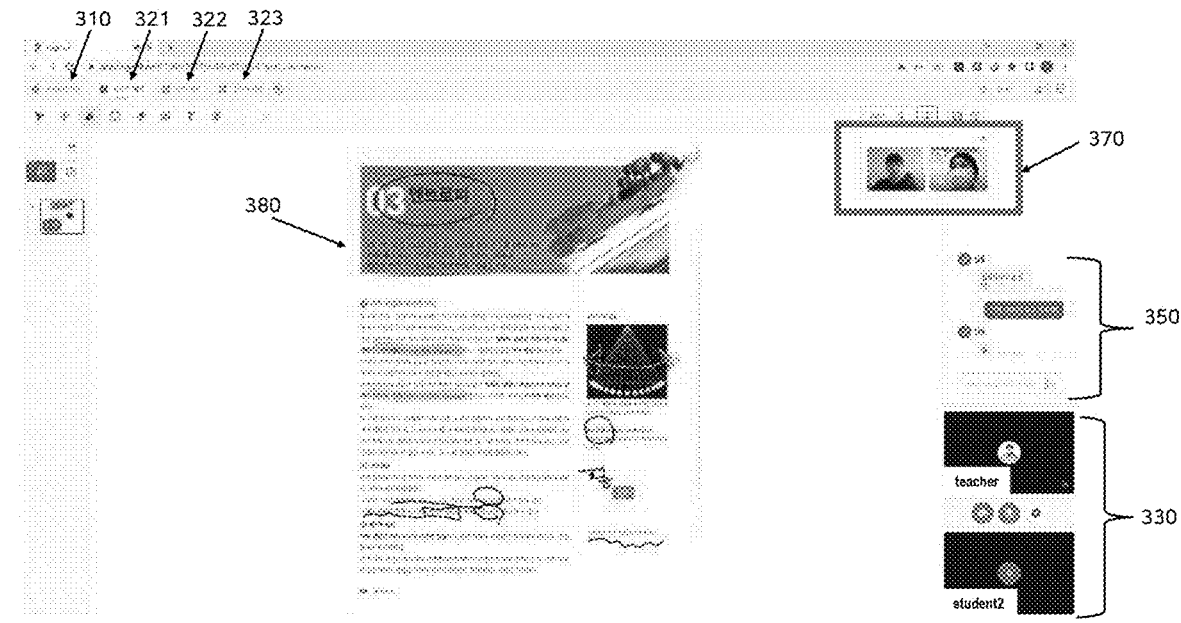
FIG. 7 is a diagram illustrating a screen of a host device monitoring image screens of other participants according to an embodiment of the present disclosure.

FIG. 7 is a diagram illustrating a screen of the host device 210 monitoring image screens of other participants according to an embodiment of the present disclosure.

Referring to FIG. 7, when the first participant channel 321 is connected on a screen of the host device 210, the image processing unit 120 may be configured to deactivate voice conversations with the participants other than a first participant when a first voice conversation between a host and the first participant is activated through the first participant channel 321, and display only an image screen of each of the other participants such as a second participant on the image monitoring display unit 370 of the host device 210, so that current statuses of the participants in another participant channel may be visually monitored and voices of the other participants may not be heard. Meanwhile, because the image monitoring display unit 370 is not visible on a screen of the participant device 220, the participants may not know whether the other participants exist.

In addition, the image processing unit 120 may be configured to display data shared between the host and the first participant through a shared data display unit 380 on the screen and perform notes or writing together.

Figure 8:
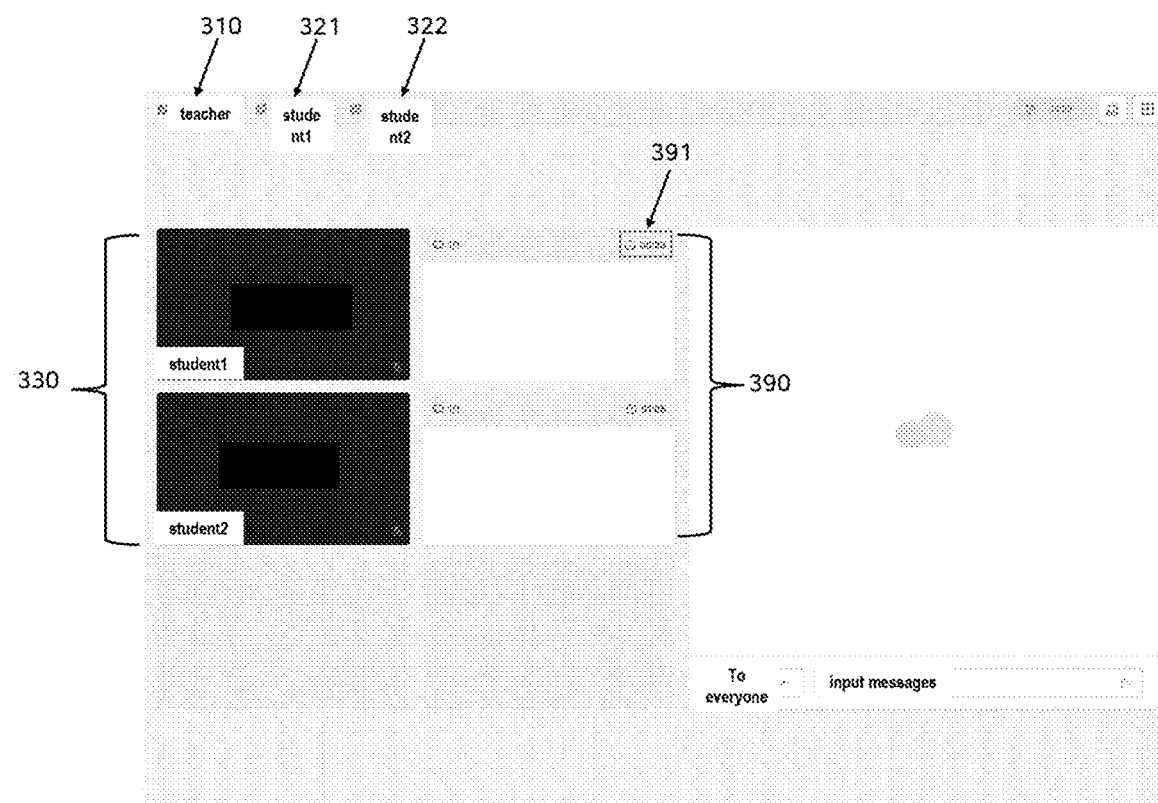
FIG. 8 is a diagram illustrating a screen of a host device checking whiteboard contents of all participants according to an embodiment of the present disclosure.

FIG. 8 is a diagram illustrating a screen of the host device 210 checking whiteboard contents of all participants according to an embodiment of the present disclosure.

When a host connects to a host channel on the screen of the host device 210, the host may be configured to check whiteboard content of each of a plurality of participants through a whiteboard display unit 390 next to an image display of each participant channel on the image display unit 330. The host and each participant owns an independent whiteboard, and a corresponding recorded content is only shared between the host and each participant, but the host channel may allow the host to monitor whiteboards of all participants in real time and start communication at an appropriate time.

In addition, a channel participation time 391 for which a corresponding participant stays on a participant channel is displayed on a partial area of the whiteboard display unit 390 displayed on the screen of the host device 210, so that the host may check the total time for which each participant participates in a channel at a glance.

Figure 9:
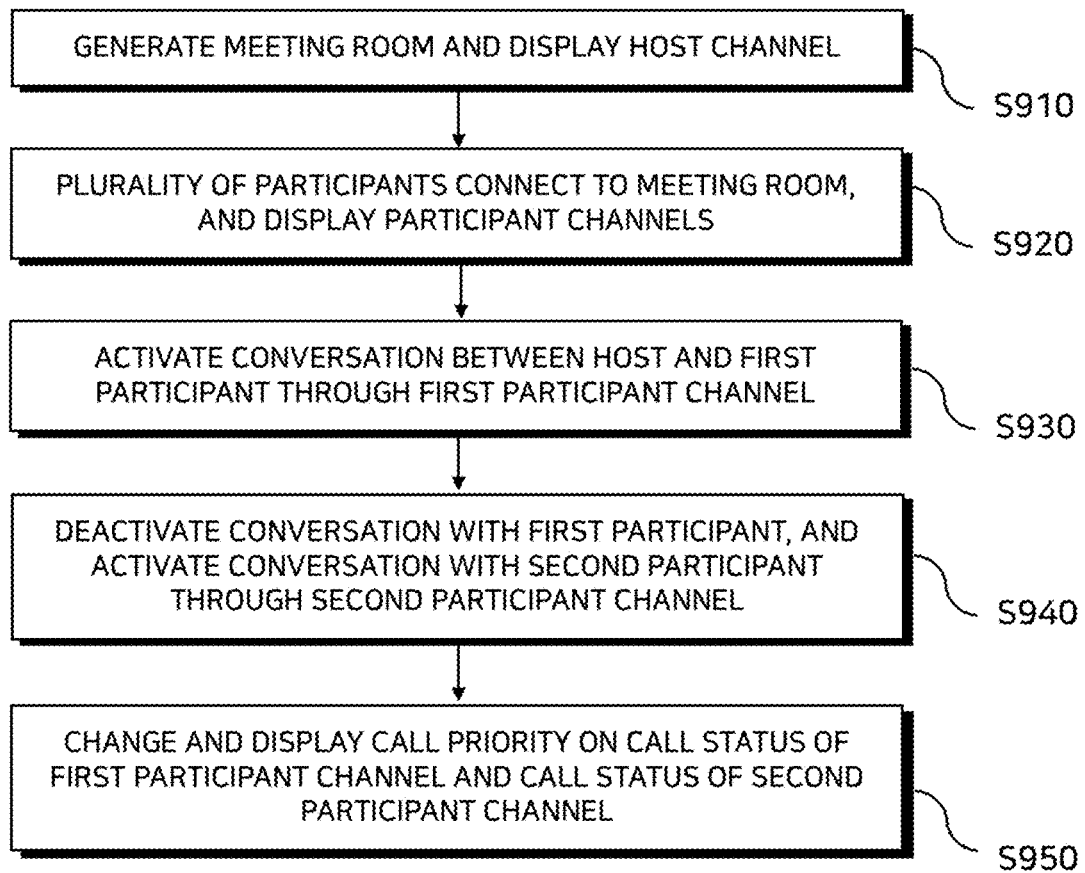
FIG. 9 is a flowchart illustrating a method of managing a communication channel for each of a plurality of participants of an online meeting room through a service server according to an embodiment of the present disclosure.

FIG. 9 is a flowchart illustrating a method of managing a communication channel for each of a plurality of participants of an online meeting room through a service server according to an embodiment of the present disclosure.

First, a host may generate a meeting room and display a host channel through the host device 210 (S910).

A plurality of participants may connect to the generated meeting room, and participant channels may be displayed (S920). Both the host channel and each participant channel may be displayed on the host device 210, and only a corresponding participant channel may be displayed on the participant device 220.

The host connects to a first participant channel so that a conversation between the host and a first participant may be activated through the first participant channel (S930).

The host may terminate the connection to the first participant channel, deactivate the conversation with the first participant, and activate a conversation with a second participant through connection to a second participant channel (S940).

According to connection of the host to each participant channel, a call priority may be changed and displayed on a call status of the first participant channel and a call status of the second participant channel (S950). For example, on a channel status display of two participants, the call priority may be displayed in the order in which the host is first called, with numbers such as 1 and 2 together with the call status display, and when the host connects to the first participant channel of a first priority, the display of the call status and call priority display corresponding to the first participant channel may be deactivated and removed, and the call priority corresponding to the second participant channel of a second priority may be changed from 2 to 1 and displayed.

In the above, a method and system according to the embodiments of the present disclosure have been described as specific various embodiments, but this is only an example, and the present disclosure is not limited thereto, and should be construed as having the widest scope according to the basic idea disclosed herein. Those skilled in the art may combine and replace the disclosed embodiments to implement a pattern having a shape that is not indicated, but this also does not depart from the scope of the present disclosure. In addition, those skilled in the art may easily change or modify the disclosed embodiments based on the present specification, and it is clear that such changes or modifications also belong to the scope of the present disclosure.

What is claimed is:

1. A method of managing a communication channel for each of a plurality of participants, the method comprising:
   displaying, on a screen of a host device, a host channel that only a host is able to enter;
   displaying, on the screen of the host device, a first participant channel for communication with a first participant and a second participant channel for communication with a second participant;
   in response to the host being called by the first participant, displaying, on the screen of the host device used by the host, a call status of the first participant channel, and a call priority of the first participant channel;
   in response to the host being called by the second participant, displaying, on the screen of the host device used by the host, a call status of the second participant channel, and a call priority of the second participant channel in addition to displaying the call status of the first participant channel and the call priority of the first participant channel;
   in response to the first participant channel being selected by the host device, activating a first voice conversation between the host and the first participant through the first participant channel, removing display of the call status of the first participant channel on the screen of the host device, and changing the call priority of the second participant channel and displaying the changed call priority of the second participant channel on the screen of the host device; and
   in response to the second participant channel being selected by the host device, deactivating the first voice conversation with the first participant, and activating a second voice conversation between the host and the second participant through the second participant channel,
   wherein the plurality of participants participate in an online meeting room.

2. The method of claim 1, wherein the host channel and the first and second participant channels are displayed in a tab form on a web browser.

3. The method of claim 1, wherein in response to the host channel being selected by the host, the host device is configured to select each of the plurality of participants and send and receive a message to and from each participant.

4. The method of claim 1, further comprising:
   in response to the host being called by the first participant, displaying the call status of the first participant channel on the screen of the host device; and
   in response to the first participant channel being selected by the host device after a call of the first participant, removing the displaying of the call status of the first participant channel on the screen of the host device.

5. The method of claim 1, further comprising:
   in response to the first voice conversation between the host and the first participant being activated through the first participant channel, deactivating voice conversations with participants other than the first participant; and
   displaying an image screen of each of the other participants on the screen of the host device for monitoring the other participants.

6. The method of claim 1, further comprising:
in response to the host channel being selected by the host, displaying all whiteboard screens of the plurality of participants on the screen of the host device.

7. A system for managing a communication channel for each of a plurality of participants, the system comprising:
a service server;
a host device configured to transmit a request for generating a meeting room to the service server; and
a plurality of participant devices configured to transmit a connection request related to entrance to the meeting room to the service server,
wherein the host device is configured to:
display a host channel that only a host is able to enter on a screen of the host device,
display a first participant channel for communication with a first participant and a second participant channel for communication with a second participant,
in response to the host being called by the first participant, display, on the screen of the host device used by the host, a call status of the first participant channel, and a call priority of the first participant channel,
in response to the host being called by the second participant, display, on the screen of the host device used by the host, a call status of the second participant channel, and a call priority of the second participant channel in addition to displaying the call status of the first participant channel and the call priority of the first participant channel,
in response to the first participant channel being selected by the host device, activate a first voice conversation between the host and the first participant through the first participant channel, remove the display of the call status of the first participant channel on the screen of the host device, and change the call priority of the second participant channel and display the changed call priority of the second participant channel on the screen of the host device, and
in response to the second participant channel being selected by the host device, deactivate the first voice conversation with the first participant, and activate a second voice conversation between the host and the second participant through the second participant channel.

8. The method of claim 1, wherein the call priority of the first participant channel, and the call priority of the second participant channel are consecutive numbers.

9. The system of claim 7, wherein the call priority of the first participant channel, and the call priority of the second participant channel are consecutive numbers.

* * * * *